No. 681,082. Patented Aug. 20, 1901.
W. M. THOMAS.
COTTON PRESS.
(Application filed Feb. 20, 1900. Renewed July 12, 1901.)
(No Model.)
3 Sheets—Sheet 1.

WITNESSES:
L. C. Hill
J. D. Kingsbury

INVENTOR
William M. Thomas
BY
Whitaker Prewitt
Attorneys

No. 681,082. Patented Aug. 20, 1901.
W. M. THOMAS.
COTTON PRESS.
(Application filed Feb. 20, 1900. Renewed July 12, 1901.)
(No Model.) 3 Sheets—Sheet 2.
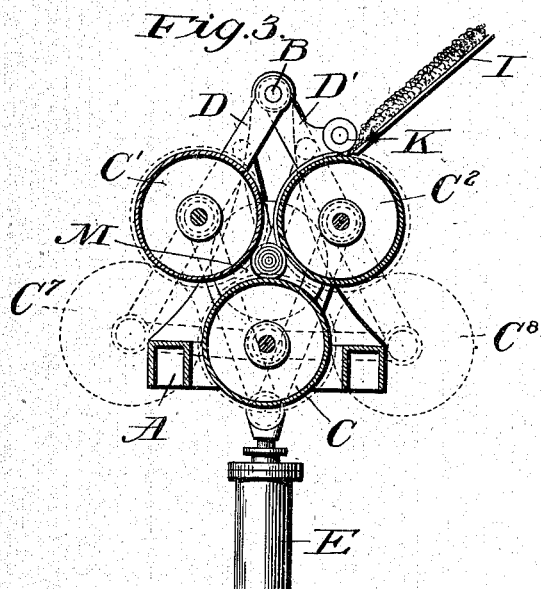
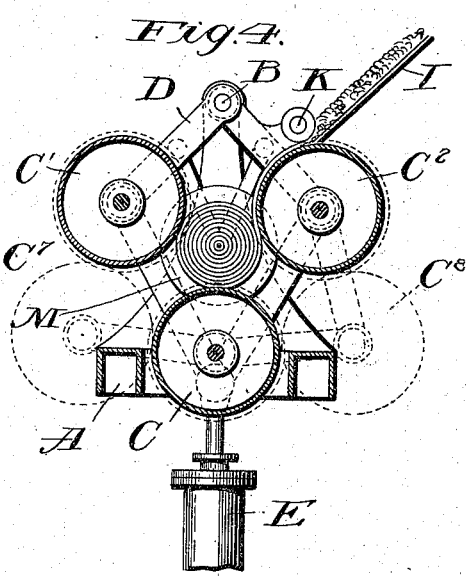
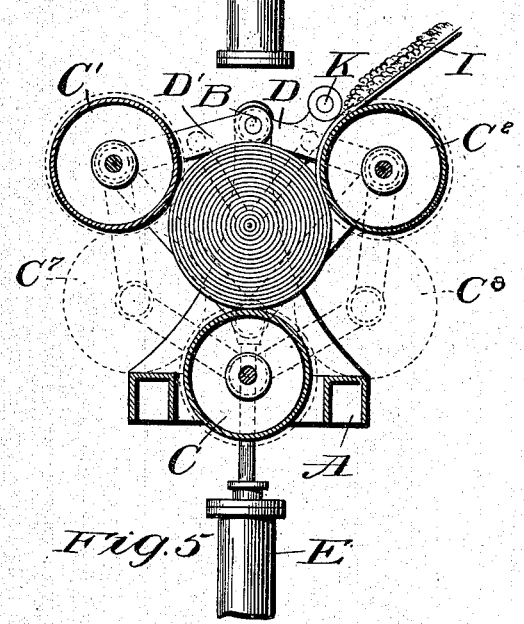
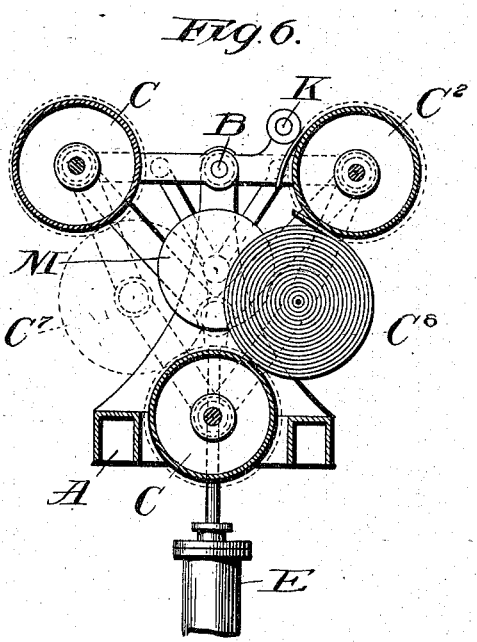
WITNESSES:
L. C. Hills
J. D. Kingsbury
INVENTOR
William M. Thomas
BY Whitaker Prevost
Attorney

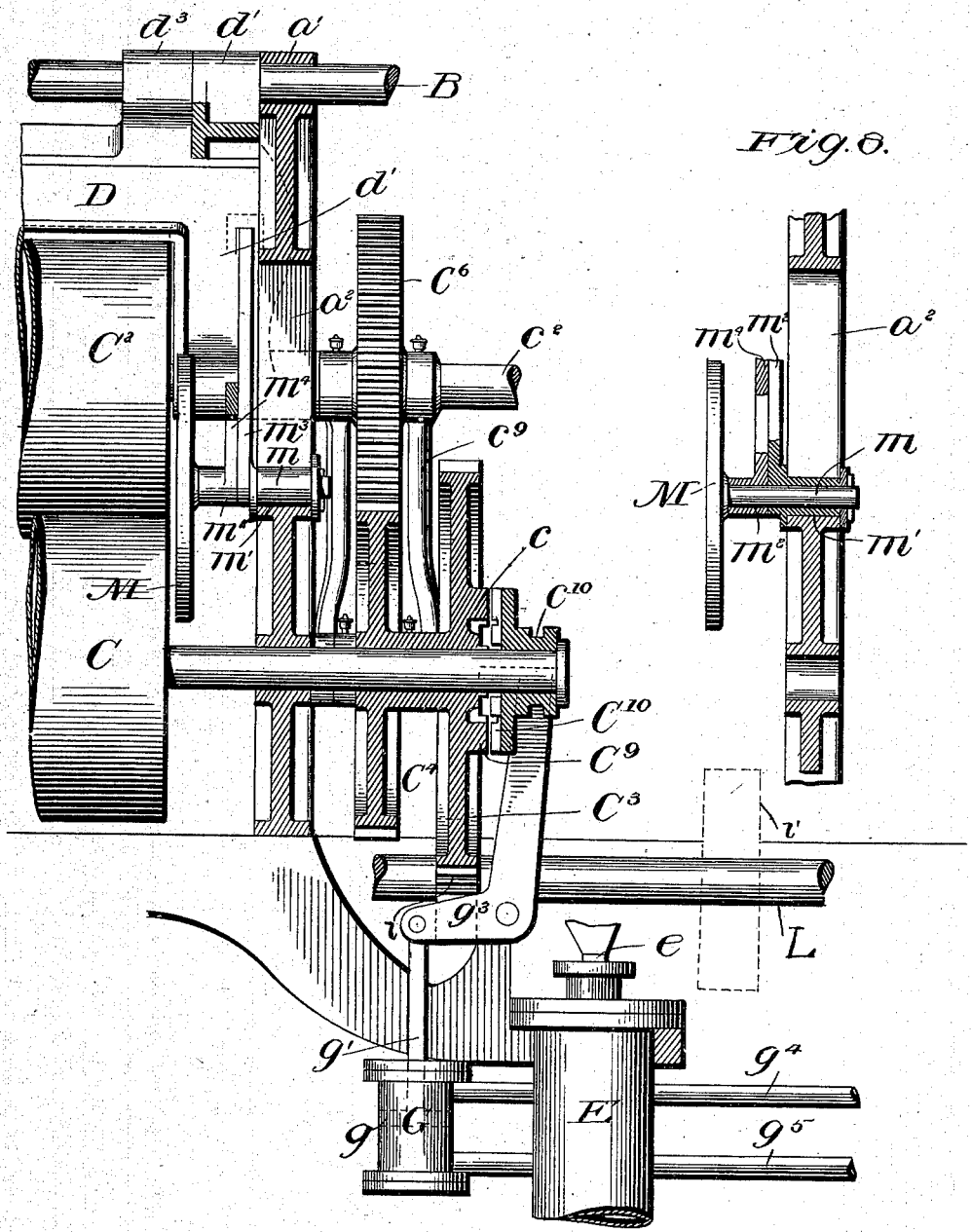

UNITED STATES PATENT OFFICE.

WILLIAM M. THOMAS, OF CHICAGO, ILLINOIS, ASSIGNOR TO THE THOMAS COTTON COMPANY, OF SAME PLACE.

COTTON-PRESS.

SPECIFICATION forming part of Letters Patent No. 681,082, dated August 20, 1901.

Application filed February 20, 1900. Renewed July 12, 1901. Serial No. 68,107. (No model.)

*To all whom it may concern:*

Be it known that I, WILLIAM M. THOMAS, a citizen of the United States, residing at Chicago, in the county of Cook and State of Illinois, have invented certain new and useful Improvements in Cotton-Presses; and I do hereby declare the following to be a full, clear, and exact description of the invention, such as will enable others skilled in the art to which it appertains to make and use the same.

My invention is an improvement in cotton-baling presses for producing a coreless cylindrical bale, or a bale in which the bat is wound spirally upon itself without the use of a core or mandrel; and it consists in the novel features hereinafter described, reference being had to the accompanying drawings, which illustrate one form in which I have contemplated embodying my invention, and said invention is fully disclosed in the following description and claims.

Figure 1:
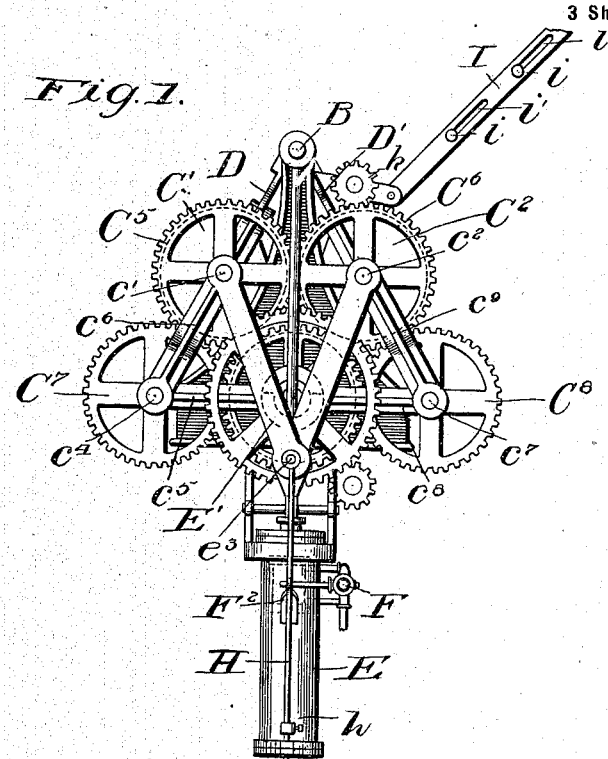
Figure 2:
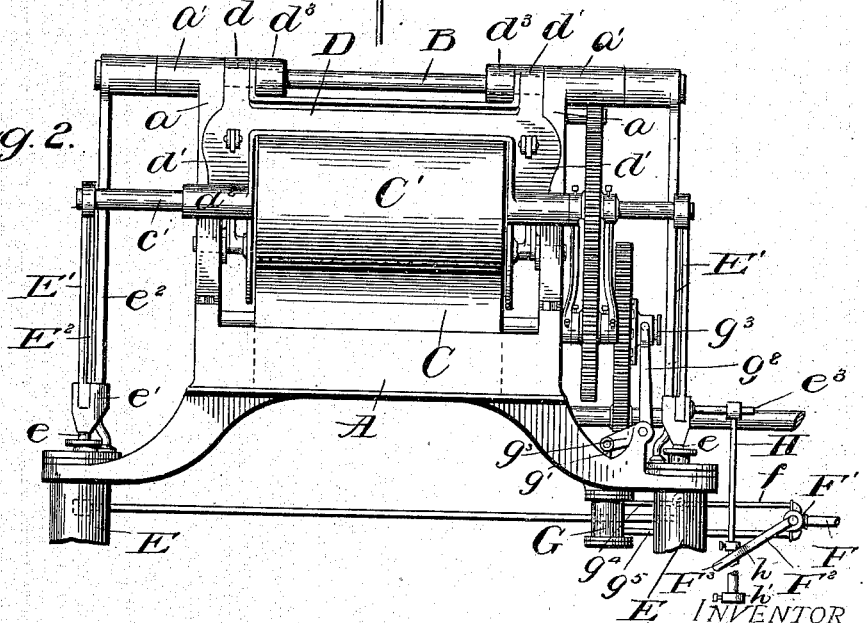

Referring to the drawings, Figure 1 represents an end view of a press embodying my invention. Fig. 2 is a side view of the same. Figs. 3, 4, 5, and 6 are diagrammatic views illustrating the different positions which the upper or movable rolls assume during the formation of a bale and up to the time of discharging the finished bale. Fig. 7 is an enlarged sectional detail illustrating the clutch mechanism for stopping the lower or non-movable roller when the bale is discharged. Fig. 8 is a detail sectional view showing the means for supporting the rotary head or end plate for preventing the roll from being forced longitudinally beyond the ends of the rollers during its formation.

In the drawings, A represents the main frame of the machine, which is provided with two vertically-disposed tapering end plates $a$, each of which is provided at its upper end with a bearing-sleeve $a'$, in which is mounted the stationary pivot-shaft B.

C represents the lower or non-movable compressing-roller or bale-forming roller, which is mounted rigidly upon a shaft $c$, supported in suitable bearings formed in the main frame of the machine.

D represents a hanger or pivoted frame for carrying the movable roller C', said hanger being provided with two perforated ears or sleeves $d$, pivotally engaging the pivot-shaft B and having downwardly-extending arms $d'$, provided at their lower ends with bearing-sleeves $d^2$, in which are mounted the shaft $c'$ of the roller C', the said roller C' being mounted rigidly upon said shaft between the arms $d'\ d'$ of the hanger. D' represents a similar hanger provided with perforated ears $d^3\ d^3$, pivotally mounted on the shaft B, as shown, and carrying the bearings in which is mounted the shaft $c^2$ of the other upper or movable roller C², the two hangers being substantially identical in construction and extending on opposite sides of a perpendicular plane passing through the shaft B.

Motion is imparted to the three bale-forming rollers C, C', and C² by the following mechanism: Upon the shaft $c$ of the stationary roller C (see Fig. 7) is mounted a sleeve $c^3$, loosely mounted on said shaft and provided with a driving gear-wheel C³ and a gear-wheel C⁴, formed integrally with or rigidly connected to said sleeve, so that they shall revolve together. The shaft $c'$ of the roller C' is provided with a gear C⁵, and the shaft $c^2$ of the roller C² is provided with a gear C⁶, both of said gears being in the vertical plane of the gear C⁴. Motion is imparted from the gear C⁴ to the gear C⁵ by means of an idler or idle gear C⁷, mounted upon a stud $c^4$, which stud is connected by links $c^5\ c^5$ with the shaft $c$ and by links $c^6\ c^6$ with the shaft $c'$, so that the motion shall always be transmitted, no matter what position is assumed by the roller C'. Motion is transmitted from the gear C⁴ to the gear C⁶ by means of an idle gear C⁸, mounted on a stud $c^7$, which stud is connected by links $c^8\ c^8$ to the shaft $c$ and by links $c^9\ c^9$ to the shaft $c^2$. I provide a clutch mechanism between the driving gear-wheel C³ and the shaft $c$ of the stationary roller C, so that the rotation of said shaft may be stopped without stopping the rotation of the other rollers. In this instance I have shown the gear-wheel C³ provided with a clutch member C⁹, and I provide a movable clutch member C¹⁰, splined on the shaft $c$ and capable of being moved into and out of engagement with the clutch member C⁹ by mechanism hereinafter described.

From the foregoing description it will be apparent that the movable rollers C' C² can move upward and outward in paths concentric with the axis of the shaft B. I provide the following means for exerting a downward pressure of the desired degree upon sail rollers, so as to roll on the bat in the formation of the bale under the desired pressure. To this end I provide at each end of the machine a cylinder E, provided with a suitable piston (not shown) and piston-rod $e$, the upper end of which is provided with a cross-head $e'$, adapted to slide on the guide-rod $e^2$, extending from the cylinder to the shaft B. Each cross-head $e'$ is connected by a link $E'$ with the shaft $c'$ of the roller $C'$ and by a link $E^2$ with the shaft $c^2$ of the roller $C^2$. The cylinders E E are connected with a pipe leading to a fluid-pressure supply, which may be hydraulic, steam, or compressed air, or pressure by friction-brake, as preferred, and by this means the bale can be formed under the desired pressure, regulated by the pressure of the fluid supplied to the cylinder. In the present instance I have illustrated a fluid-pressure-supply pipe F, which is connected to each of the cylinders E E by suitable leading-pipes $f f$. I also prefer to provide a smaller cylinder G, provided with a piston $g$, working therein, the piston-rod $g'$ of which is operatively connected to the bell-crank lever $g^2$, one arm of which is provided with a yoke $g^3$, engaging an annular groove $c^{10}$ in the clutch member $C^{10}$ for the purpose of throwing said clutch member into and out of gear with the clutch member $C^9$. I provide the cylinder G with two pipes $g^4$ $g^5$ for supplying fluid under pressure from the pipe F to opposite sides of the piston $g$.

In order to render the operation of the machine automatic, I prefer to provide the following construction: One of the cross-heads $e'$, preferably the one adjacent to the bell-crank lever $g^2$, is provided with a stud $e^3$, to which is connected a vertical rod H, which I term a "stop-rod," said rod being provided with two adjustable stops $h$ $h'$ in the form of collars adjustably secured to the rod H by means of set-screws.

$F'$ represents a cock or valve of such construction as to be capable of controlling the admission of fluid under pressure to the cylinders E E and the clutch-operating cylinder G, said cock being provided with an operating arm or lever $F^2$, provided with a yoke $F^3$, adapted to engage the stop-rod H between the adjustable stops $h$ and $h'$.

The operation of the machine will be as follows: Prior to the formation of the bale the rollers $C'$ $C^2$ will be in a lowermost position, as illustrated in Fig. 3. The bat is fed down an inclined extensible chute I, which has its lower end pivotally connected to the hanger $D'$, said chute being formed in two parts adapted to telescope with respect to each other and connected by bolts $i$, secured to one part and engaging slots $i'$, formed in the other parts, as shown in Fig. 1. From the chute I the bat passes under a feeding-roller K, mounted in bearings secured to the hanger $D'$, the shaft of said roller being provided with a small pinion $k$, (see Fig. 1,) meshing with the gear-wheel $C^6$, from which it receives motion. The valve-operating lever $F^2$ is in the position shown in Fig. 2, in which position the cock or valve $F'$ is in position to admit the fluid under pressure to the cylinders E E and to the upper side of the piston $g$, thereby holding the clutch member $C^{10}$ in engagement with the clutch member $C^9$ and causing the shaft $c$ and lower roller C to revolve with the other roller. Motion is imparted to the driving-gear $C^3$ from a suitable driving-shaft L, provided with a driving-pinion $l$, engaging the gear $C^3$, and having also a band-pulley or other driving device $l'$. When the formation of a bale commences, the rollers are in the position illustrated diagrammatically in Fig. 3, the three rollers C, $C'$, and $C^2$ being close together. The bat after passing between the feed-roller K and the upper roller $C^2$ passes into the space between the three rollers and is wound spirally upon itself to form the first or central portion of the bale, which gradually increases in size until it is of sufficient density to exert an upward pressure upon the movable rollers $C'$ $C^2$. When the upward pressure of the bale is sufficient to overcome the pressure of the fluid supplied to the cylinders E E, the said upper rollers will move upwardly and outwardly, as indicated diagrammatically in Figs. 4 and 5, until the bale reaches the desired size, which is controlled by the position of the lower stop $h'$ on the stop-rod H. When this stop $h'$ is raised sufficiently, it will engage the yoke $F^3$ on the valve-operating lever $F^2$ and operate said lever, thereby cutting off the supply of fluid under pressure to the cylinders E E, cutting off the supply of fluid under pressure to the upper side of the piston $g$ and admitting the fluid to the lower side of the piston $g$. The piston $g$ will immediately move upward, thereby throwing out the clutch member $C^{10}$ from engagement with the gear-wheel $C^3$ and disconnecting the shaft $c$ and roller C, thus stopping said roller to allow the other rollers to continue to revolve. The fluid-pressure having been cut off from the cylinders E, there is no further resistance to the upward movement of the upper rollers, save their own weight, and the lower roller having stopped the continued rotation of the upper rollers in the directions indicated by the arrows (see particularly Fig. 6) will cause the roller $C^2$ to roll the bale out of the press, as clearly indicated in that figure, at the same time breaking the bat. As soon as the bale has passed from under the roller $C^2$, the upper rollers will descend by their own weight, pushing down the piston in the cylinders E E until the upper stop $h$ on the stop-rod H engages the valve-operating lever $F^2$ and moves it down, thereby readmitting the fluid under pressure to the cylinders E and to the upper side of the piston $g$ in cylinder G, thus throwing in the clutch and immediately starting the formation of another bale. It will be seen, therefore, that the operation of this machine is continuous and automatic.

In order to prevent the bale while it is being formed from expanding longitudinally beyond the ends of the three bale-forming rollers, I provide at each end of said rollers a circular revoluble head M, (see Fig. 8,) mounted upon a stud $m$, carried in bearings $m'$ $m^2$ on the lower ends of links $m^3$ $m^4$, which are pivotally connected at their upper ends to the hangers D and D', respectively. The said bearings extend through a slot $a^2$, formed in each of the vertical standards $a$ of the main frame. The arrangement of the links $m^3$ $m^4$ is such that the axes of rotation of the heads M are always in line with the axis of rotation of the bale during its formation.

What I claim, and desire to secure by Letters Patent, is—

1. In a cotton-baling press, the combination with the stationary and movable bale-forming rollers, of mechanism for revolving said rollers including a clutch for disconnecting one of said rollers without stopping the others, pressure devices for exerting a pressure on said movable rollers in a direction toward the stationary roller, a controlling device for releasing said pressure devices and an automatic device operated by the movement of said movable rollers away from the stationary roller for operating said controlling device and clutch to effect the discharge of the finished bale, substantially as described.

2. In a cotton-baling press, the combination with a stationary roller and movable rollers, mechanism for driving all of said rollers including a clutch for disconnecting one of said rollers without stopping the movement of the others, fluid-pressure devices operatively connected with said movable rollers, a controlling-valve therefor and automatic devices operatively connected with said movable rollers for operating said clutch and said controlling-valve to effect the automatic discharge of the finished bale, substantially as described.

3. In a cotton-baling press, the combination with the stationary roller and movable rollers, of means for imparting rotary motion to all of said rollers including a clutch for disconnecting one of said rollers from its driving mechanism without stopping the other rollers, fluid-pressure devices operatively connected with said movable rollers, a controlling device therefor, means for operating said clutch and a stop-bar provided with adjustable stops for effecting the operation of said controlling-valve and clutch, substantially as described.

4. In a cotton-baling press, the combination with the stationary roller and movable rollers, of means for imparting rotary motion to all of said rollers including a clutch for disconnecting one of said rollers from its driving mechanism without stopping the other rollers, fluid-pressure devices operatively connected with said movable rollers, a fluid-pressure device for operating said clutch, a valve controlling said fluid-pressure devices and said fluid-pressure clutch-operating device and a stop-bar operatively connected with said movable rollers and provided with adjustable stops for moving said controlling-valve, substantially as described.

5. In a cotton-baling press, the combination with the stationary roller and movable rollers, of means for imparting rotary motion to all of said rollers including a clutch for disconnecting one of said rollers from its driving mechanism without stopping the other rollers, fluid-pressure devices operatively connected with said movable rollers, a fluid-pressure clutch-controlling device, a controlling-valve for controlling the supply of fluid to said fluid-pressure devices and said fluid-pressure clutch-operating device, an operating-lever connected to said valve, a stop-rod operatively connected with said movable rollers and provided with adjustable stops for engaging said lever, substantially as described.

In testimony whereof I affix my signature in the presence of two witnesses.

WILLIAM M. THOMAS.

Witnesses:
FRANK W. BIGELOW,
WILLIAM H. REEVES.